United States Patent [19]

Gary

[11] Patent Number: 5,874,007
[45] Date of Patent: *Feb. 23, 1999

[54] PURIFICATION OF AN INERT FLUID IN THE LIQUID STATE WITH RESPECT TO $H_2$ AND/OR CO

[75] Inventor: Daniel Gary, Montigny-le-Bretonneux, France

[73] Assignee: L'Air Liquide, Societe Anonyme pour l'Etude et l'Exploitation des Procedes Georges Claude, Paris Cedex, France

[ * ] Notice: The term of this patent shall not extend beyond the expiration date of Pat. No. 5,589,151.

[21] Appl. No.: 927,807

[22] Filed: Sep. 12, 1997

[30] Foreign Application Priority Data

Sep. 16, 1996 [FR] France ................................ 96 11271

[51] Int. Cl.⁶ ............................................. B01D 15/08
[52] U.S. Cl. ........................... 210/679; 210/660; 423/248
[58] Field of Search ............................ 62/640; 210/660, 210/679; 423/247, 248, 351

[56] References Cited

U.S. PATENT DOCUMENTS

| | | | |
|---|---|---|---|
| 4,668,260 | 5/1987 | Yoshino | 62/656 |
| 5,349,822 | 9/1994 | Nagamura et al. | 62/39 |
| 5,366,712 | 11/1994 | Violante et al. | 423/248 |
| 5,589,151 | 12/1996 | Gary | 423/351 |
| 5,685,172 | 11/1997 | Darredeau et al. | 62/636 |

*Primary Examiner*—Michael Lewis
*Assistant Examiner*—Stuart L. Hendrickson
*Attorney, Agent, or Firm*—Young & Thompson

[57] ABSTRACT

Process for purifying an inert fluid in the liquid state, containing at least one of the impurities hydrogen ($H_2$) and carbon monoxide (CO), with respect to at least one of the impurities, characterized in that:

a) the fluid in the liquid state which is to be purified is passed through at least one bed of particles of at least one adsorbent in order to adsorb at least one of the impurities $H_2$ and CO;

b) a fluid in the liquid state which is substantially purified with respect to at least one of the impurities $H_2$ and CO is recovered.

14 Claims, 1 Drawing Sheet

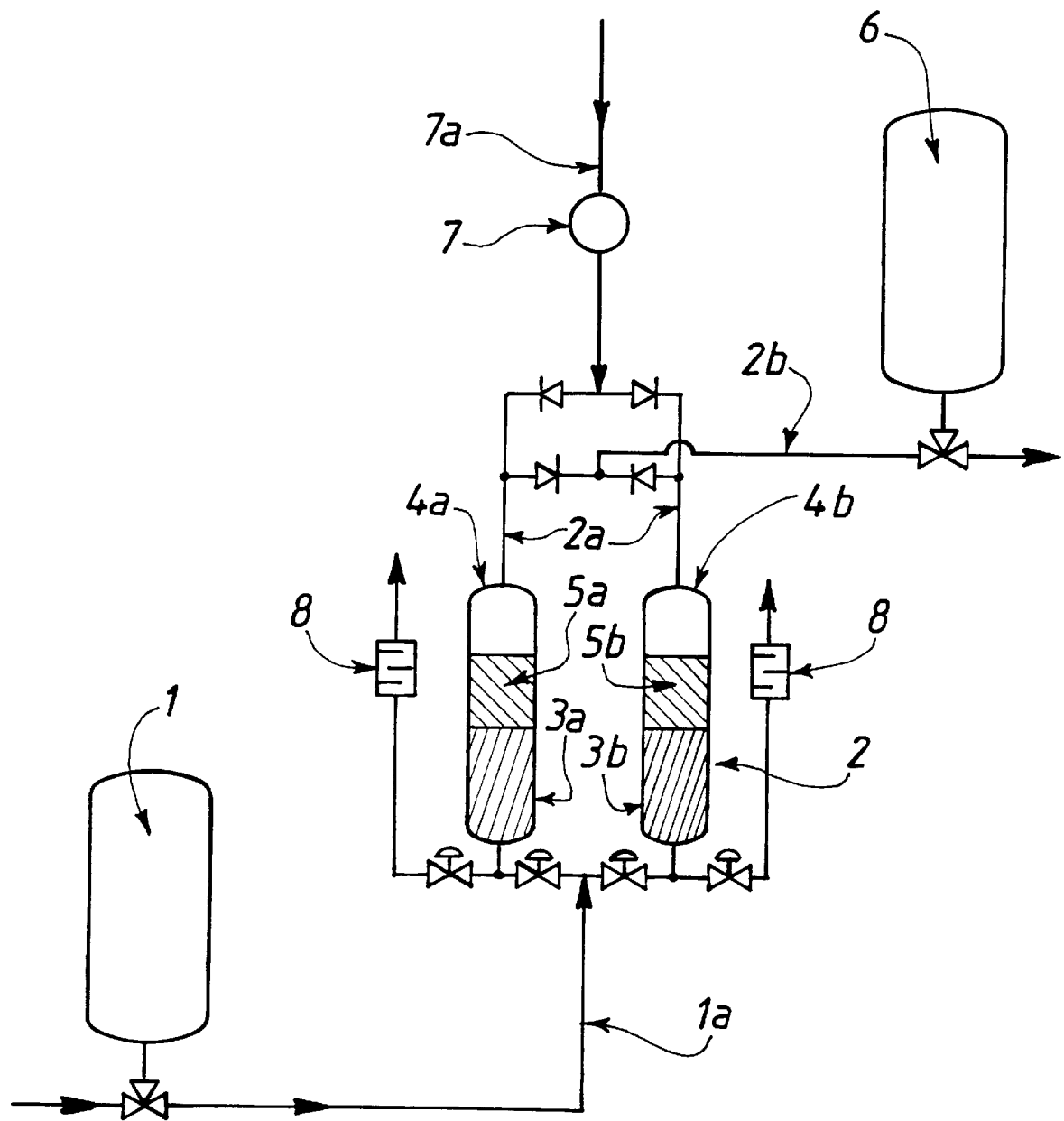

PURIFICATION OF AN INERT FLUID IN THE LIQUID STATE WITH RESPECT TO $H_2$ AND/OR CO

FIELD OF THE INVENTION

The present invention relates to a process and to a device for purifying an inert fluid in the liquid state with respect to at least one of its impurities hydrogen ($H_2$) and carbon monoxide (CO).

BACKGROUND OF THE INVENTION

The inert gases, such as nitrogen, and the rare gases, namely helium, neon, argon, krypton, xenon and mixtures thereof, are commonly employed in a number of industries, in particular the electronics industry. The latter, quite particularly, requires the inert gases to be as pure as possible, and to have their impurities removed, in particular hydrogen and carbon monoxide.

These inert gases are usually produced by cryogenic distillation after liquefaction.

However, the liquefied inert gases obtained in this way generally contain impurities such as hydrogen ($H_2$) and carbon monoxide (CO), in proportions which are generally greater than a few hundred ppb (parts per billion by volume), or even a few ppm (parts per million by volume), which it is necessary to remove.

A number of processes for purifying inert fluids are known from the prior art, but they generally have several drawbacks or disadvantages, namely:

either they are ill-suited to purifying inert fluids in the liquid state, or they do not permit purification with respect to the impurities $H_2$ and/or CO contained in the inert fluid which is to be purified, or they need the inert fluid to be vaporized prior to its purification. However, it is clear that, when it is desired to obtain an inert fluid in the liquid state which is substantially purified with respect to its impurities $H_2$ and/or CO, the need to successively vaporize the inert fluid which is to be purified, purify the inert gas, then reliquefy the purified inert gas obtained, represents a major economic drawback, especially as regards energy expenditure and the equipment to be used.

Thus, U.S. Pat. No. 3,996,082 describes a process for purifying argon gas with respect to its impurity oxygen, by passing this argon through a synthetic type A zeolite.

For its part, U.S. Pat. No. 2,874,030 describes a process for purifying argon gas with respect to its impurity oxygen, in which the oxygen is converted into water by catalytic reaction with an excess of hydrogen; the water which is formed being subsequently removed using a dehydrating means.

For its part, Patent Application EP-A-0,350,656 describes a process for purifying an inert gas with respect to its impurities oxygen, carbon monoxide and hydrogen, in which the carbon monoxide (CO) and the hydrogen ($H_2$) that are present in the inert gas are removed by catalytic oxidation at a temperature of between 150° and 250° C. in the presence of a first catalyst based on reduced copper, then of a second catalyst based on oxidized copper, to give carbon dioxide $CO_2$ and water $H_2O$ which are subsequently removed by adsorption at ambient temperature on an adsorbent of the molecular sieve type.

Thus, none of the processes which currently exist is suitable for the purification of inert fluids in the liquid state with respect to their impurities hydrogen ($H_2$) and/or carbon monoxide (CO), that is to say inert fluids liquefied at cryogenic temperature (below their bubble point).

It is therefore necessary to develop novel processes for purifying inert fluids in the liquid state with respect to their impurities $H_2$ and/or CO.

OBJECTS OF THE INVENTION

The object of the present invention is therefore to provide a process for obtaining an inert fluid in the liquid state, for example nitrogen or the rare gases, substantially purified with respect to at least one of its impurities hydrogen and/or carbon monoxide:

which is easy to use industrially and is of reasonable cost, which makes it possible to obtain a very high-purity inert fluid in the liquid state, that is to say containing at most about 1 ppb±1 of hydrogen and/or of carbon monoxide, which can be used at temperatures which are cryogenic for the inert fluids in the liquid state, namely temperatures which are generally lower than −180° C., which uses inexpensive and/or readily accesible adsorbents, and which do not require vaporization prior to the purification of the liquid fluid to be purified, then subsequent reliquefaction of the purified fluid.

SUMMARY OF THE INVENTION

The invention therefore consists of a process for purifying an inert fluid in the liquid state, containing at least one of the impurities hydrogen ($H_2$) and carbon monoxide (CO), with respect to at least one of the impurities, characterized in that:

a) the fluid in the liquid state which is to be purified is passed through at least one bed of particles of at least one adsorbent in order to adsorb at least one of the impurities $H_2$ and CO contained in the inert fluid in the liquid state;

b) the inert fluid in the liquid state which is substantially purified with respect to at least one of the impurities $H_2$ and CO is recovered.

Preferably, the particles comprise at least one metal.

Preferably, the particles consist of at least one metal supported on at least one support.

Advantageously, the metal is chosen from the group formed by platinum (Pt), palladium (Pd), rhodium (Rh) and iridium (Ir).

Preferably, the support is chosen from the group formed by alumina, silica, zeolites and titanium dioxide ($TiO_2$).

According to a preferred form of the invention, the adsorbent particles are palladium (Pd) particles supported on an alumina-type support.

Advantageously, the adsorbent particles comprise from 0.5 to 5% by weight of palladium (Pd), preferably of the order of 2%.

The adsorbent particles according to the invention are in a form contained in the group formed by rods, granules and balls.

According to a preferred form of the invention, the adsorption step is carried out on a fluid in the liquid state, and therefore at a temperature lower than or equal to its boiling point.

Preferably, the fluid in the liquid state which is to be purified is chosen from the group formed by liquid nitrogen, liquid argon and liquid helium.

In some cases, it is also necessary or desirable to purify the inert fluid in the liquid state with respect to its impurity oxygen. In this case, according to another embodiment, the process according to the invention comprises a subsidiary step of passing the inert fluid in the liquid state through at least one bed of particles of at least a second adsorbent for the purpose of adsorbing the impurity oxygen $O_2$. This subsidiary step of adsorbing oxygen on at least one bed of particles of at least a second adsorbent precedes and/or follows step a).

In other words, the removal of the impurity oxygen from the inert fluid in the liquid state may be carried out, as desired, before removal of the impurities $H_2$ and/or CO, and/or thereafter.

According to a first embodiment, the particles of the second adsorbent selectively adsorb the impurity oxygen ($O_2$).

According to a second embodiment, the particles of the second adsorbent adsorb the impurity oxygen ($O_2$) and at least one of the impurities CO and $H_2$.

Preferably, the particles of the second adsorbent are particles chosen from the group formed by porous metal oxides, for example hopcalite.

The present invention also relates to a device for purifying an inert fluid in the liquid state, containing at least one of the impurities $H_2$ and CO, with respect to at least one of the impurities, characterized in that it comprises a source of inert fluid in the liquid state which is to be purified and at least one reactor containing at least one bed of particles of at least one adsorbent for the purpose of adsorbing at least one of the impurities $H_2$ and CO, the source being connected to at least one reactor.

Preferably, the at least one reactor furthermore comprises at least one bed of particles of at least one adsorbent for the purpose of adsorbing at least the impurity $O_2$.

BRIEF DESCRIPTION OF THE DRAWINGS

A device according to the invention will now be described in more detail with reference to the appended FIGURE.

DETAILED DESCRIPTION OF THE INVENTION

The single appended FIGURE represents a device according to the invention, comprising a source of an inert fluid in the liquid state, here liquid nitrogen, which is to be purified with respect to at least one of its impurities $H_2$ and CO, this source consisting of a storage tank 1 containing liquid nitrogen. The liquid nitrogen source 1 is connected via a conduit 1a to an adsorption zone 2 comprising at least one reactor and advantageously, as represented here, two reactors 4a, 4b which each contain a bed 3a, 3b of a first adsorbent for the purpose of subsidiarily adsorbing the oxygen contained in the liquid nitrogen, and a bed 5a, 5b of a second adsorbent, placed downstream of the first bed 3a, 3b, for the purpose of adsorbing at least one of the impurities $H_2$ and CO.

The provision of an upstream bed of an adsorbent, for example hopcalite, capable of subsidiarily removing the impurity $O_2$ (and some of the CO) contained in the liquid nitrogen, makes it possible to preserve the adsorbent bed ($Pd/Al_2O_3$) intended to remove the impurities $H_2$ and/or CO by preventing it from saturating too fast, and thereby to reduce the number of regeneration phases during a given time period.

After purification, the liquid nitrogen which is purified with respect to its impurities $H_2$, CO and/or $O_2$ is sent via a conduit 2a, 2b to the site where it is used (not shown) or to a site 6 for storing purified liquid nitrogen.

As represented in the FIGURE, use is preferably made of two reactors 4a, 4b, each containing an adsorbent, for example palladium supported on an alumina support, for the purpose of removal by adsorption of the impurities $H_2$ and CO in the liquid nitrogen, and another adsorbent, for example an adsorbent of the hopcalite type, placed upstream of the first in order to subsidiarily remove the impurity $O_2$ contained in the liquid nitrogen, and possibly some of the CO. The use of two reactors allows them to be operated alternately, that is to say one of the reactors may be regenerated while the other is being used for purification.

The regeneration is carried out in conventional fashion, for example, using the following procedure:

progressively heating the adsorber using hot nitrogen gas, that is to say to a temperature of about 200° C., and at atmospheric pressure;

introducing a reducing mixture into the reactor, for example, a 2% $H_2/N_2$ mixture, heated to a temperature of 200° C. (subsidiary step: only when there is a double bed of the hopcalite-$Pd/Al_2O_3$ type);

flushing the reactor using hot nitrogen gas to allow the removal of any residual trace of hydrogen $H_2$ (subsidiary step: only when there is a double bed of the hopcalite-$Pd/Al_2O_3$ type);

flushing the reactor using nitrogen gas at ambient temperature in order to cool the adsorber and prepare it for the next purification cycle.

The regeneration circuit (not shown in detail) comprises, in particular, a conduit 7a for feeding the regeneration gas and a heater 7; the reactors 4a and 4b may be connected to the atmosphere via air vents 8, possibly fitted with silencers.

In the FIGURE, the source of liquid nitrogen to be purified has been represented in the form of a storage tank 1.

However, this representation in no way places any limitation on the invention, the term source of inert fluid in the liquid state being intended to denote any means for supplying the reactor or reactors with the fluid in the liquid state which is to be purified, for example a tanker, a supply conduit, a buffer compartment or a cryogenic distillation column.

The efficiency of the process according to the invention will now be demonstrated with the aid of illustrative, but non-limiting examples of the invention.

In the following examples, the inert fluid in the liquid state which is to be purified with respect to at least its impurities $H_2$ and CO consists of liquid nitrogen, and the adsorbent used is of the palladium type supported on a support of the alumina type ($Pd/Al_2O_3$).

The quantities of carbon monoxide CO and hydrogen $H_2$ impurities are measured using an RGA3 chromatograph marketed by the company TRACE ANALYTICAL, the detection threshold of this analyzer being of the order of 1 ppb±1 (part per billion by volume) for carbon monoxide and 5 ppb±1 for hydrogen.

EXAMPLE 1

To demonstrate the efficiency of the process according to the invention, liquid nitrogen containing about 0.75 ppm of hydrogen and 0.65 ppm of carbon monoxide was purified through an adsorbent of the palladium type supported on a support of the alumina type.

The device used for this purpose is similar to the one described above.

Two successive tests were carried out and are reported in the following Table I.

The working conditions for test 1 and for test 2 are the same, apart from the quantity of palladium impregnated on the alumina-type support. Thus, test 1 was carried out with an adsorbent containing four times more palladium than the adsorbent used in test 2.

The purification was carried out at a pressure of about 8 bar absolute ($8.10^5$ Pa) on liquid nitrogen supercooled to a temperature of the order of $-187°$ C., via an external cooling source (the bubble temperature of nitrogen is about $-172.6°$ C.).

The purification throughput is about 32 m³ (STP)/h and the contact time, that is to say the time which a molecule takes to cross the adsorbent bed, is about two minutes.

The results which were obtained have been reported in the following Table I:

TABLE I

| TEST | ADSORBENT pd/alumina (% by weight) | CONTENT ON ENTRY | | CONTENT ON EXIT | | DURATION (hours) | |
|---|---|---|---|---|---|---|---|
| | | $H_2$ | CO | $H_2$ | CO | $H_2$ | CO |
| 1 | 2% | 0.75 ppm | 0.65 ppm | N.D. | N.D. | 13 | 13.5 |
| | | 0.75 ppm | 0.65 ppm | 10 ppb | 10 ppb | 13.5 | 18 |
| | | 0.75 ppm | 0.65 ppm | 100 ppb | 100 ppb | 14.5 | 22 |
| 2 | 0.5% | 0.75 ppm | 0.65 ppm | N.D. | N.D. | 3.2 | 3.5 |
| | | 0.75 ppm | 0.65 ppm | 10 | 10 | 3.5 | 4.5 |
| | | 0.75 ppm | 0.65 ppm | 100 | NM | 3.75 | NM |

N.D.: not detected ($\leq 1$ ppb ± 1 of CO; $\leq 5$ ppb ± 1 of $H_2$),
ppm: parts per million by volume,
ppb: parts per billion by volume,
NM: not measured.

The results reported in Table I above show that:
- an adsorbent of the palladium type supported on an alumina support makes it possible to purify liquid nitrogen with respect to its impurities $H_2$ and CO to a threshold of less than one ppb (part per billion by volume);
- the adsorption capacity of the adsorbent of the palladium type supported on an alumina support is proportional to the quantity of noble metal (palladium impregnated on the support). Indeed, the adsorbent in test 1 (2% Pd/$Al_2O_3$), containing four times the palladium content of the adsorbent in test 2 (0.5% Pd/$Al_2O_3$), allows liquid nitrogen to be purified with respect to its impurities $H_2$ and CO consistently to less than 1 ppb for about 13 hours, whereas the adsorbent in test 2 allowed efficient purification of liquid nitrogen with respect to its impurities $H_2$ and CO for only one quarter of this duration, that is to say slightly more than 3 hours;
- the efficiency and consistency over time of the purification increases as the amount of supported noble metal increases. In practice, that is to say industrially, the amount of supported noble metal to be used will depend on the design volume of the adsorber (this is because it is necessary to keep to a minimum adsorbent height in order to allow a consistent contact time between the nitrogen flow and the adsorbent), the amount of impurities to be removed which are contained in the liquid nitrogen, and the volume of liquid nitrogen which it is desired to purify before carrying out a regeneration step. A palladium content of the order of 2% will thus generally be preferred to a content of 0.5%; however, a content of 4% will not necessarily be desirable;
- it is necessary to regenerate the adsorbent after a few hours of purification (for example, in our test, after about 13 hours in the case of an adsorbent of the type 2% Pd/$Al_2O_3$). This is because, after a few hours of purification, progressive saturation of the adsorbent is observed, and it needs to be regenerated in order to prevent the impurities from breaking through.

The process for purifying an inert fluid in the liquid state according to the invention is entirely satisfactory since it makes it possible to obtain purification of the inert gas in the liquid state with respect to its impurities $H_2$ and/or CO with a threshold of 1 ppb.

EXAMPLE 2

As we saw above, the adsorption efficiency depends on the adsorbent used and, in particular, on the amount of metal supported on the support.

Tests 1 and 2, reported in the above Example 1, were carried out using an adsorbent of the palladium type supported on a support of the alumina type; the characteristics of the adsorbents used in tests 1 and 2 are reported in Table II below.

TABLE II

| ADSORBENT | 2% Pd/$Al_2O_3$ | 0.5% Pd/$Al_2O_3$ |
|---|---|---|
| Ball diameter (mm) | 1.5 | 3.0 |
| BET ($m^2$/g) | 110 | 230 |
| Density (g/l) | 600 | 720 |

Although tests 1 and 2 were carried out solely using alumina balls supporting palladium, other types of support, metals and/or forms of adsorbents also lie within the scope of the present invention.

Thus, other noble metals which can also be used include platinum, rhodium and iridium.

Likewise, although an alumina-type support is preferred, other types of support may also be used within the scope of the present invention, for example supports of the silica, zeolite or titanium oxide ($TiO_2$) type.

The adsorbent may be in the form of balls, granules or rods.

Although the present invention relates to inert fluids in the liquid state, the process described here can also be used to purify very cold inert gases, that is to say at a temperature lying in the range $-130°$ C. to $-170°$ C. However, tests carried out on various very cold inert gases demonstrated only partial and therefore unsatisfactory purification, that is to say not allowing the threshold of one ppb to be reached and with almost immediate breakthrough of the impurities $H_2$ and CO.

These latter tests carried out on various inert gases moreover confirm that known processes for purifying inert gases are clearly inapplicable to the purification of inert fluids in the liquid state, and vice versa.

I claim:
1. Process for purifying an inert fluid in the liquid state, containing at least one of $H_2$ and carbon monoxide as impurities, which comprises:
   a) passing the inert fluid to be purified through at least one bed of particles comprising at least one adsorbent in order to adsorb at least one of the hydrogen and carbon monoxide impurities, said adsorbent particles consist- ing of at least one metal supported on at least one support selected from the group consisting of alumina, silica, zeolites and titanium oxide, and said metal being selected from the group consisting of platinum, palladium, rhodium and iridium; and b) recovering a fluid in the liquid state which is substantially purified with respect to at least one of the hydrogen and carbon monoxide impurities.

2. Process according to claim 1, wherein the adsorbent particles consist of palladium supported on an alumina support.

3. Process according to claim 2, wherein the adsorbent particles have a palladium content ranging from 0.5 to 10% by weight.

4. Process according to claim 1, wherein the adsorbent particles are in the form of rods, granules or balls.

5. Process according to claim 3, wherein the adsorbent particles have a palladium content of between 1 and 5% by weight.

6. Process according to claim 1, wherein the adsorption step is carried out on a liquid fluid at a temperature lower than or equal to its boiling point.

7. Process according to claim 1, wherein the inert fluid in the liquid state which is to be purified is selected from the group consisting of liquid nitrogen, liquid argon and liquid helium.

8. Process according to claim 1, wherein the inert fluid contains an oxygen impurity, the process further comprising a step of passing the inert fluid in the liquid state through at least one bed of particles of at least a second adsorbent for the purpose of adsorbing at least the oxygen impurity contained in the inert fluid in the liquid state.

9. Process according to claim 8, wherein the step of adsorbing the oxygen impurity on the second adsorbent precedes and/or follows step a) of adsorbing at least one of the hydrogen and carbon monoxide impurities.

10. Process according to claim 8, wherein the particles of the second adsorbent selectively adsorb the oxygen impurity contained in the inert fluid.

11. Process according to claim 10, wherein the particles of the second adsorbent adsorb the oxygen impurity, and at least one of the carbon monoxide and hydrogen impurities.

12. Process according to claim 11, wherein the second adsorbent is a porous metal oxide.

13. Process according to claim 12, wherein the second adsorbent is hopcalite.

14. Process according to claim 1, wherein the fluid recovered in step b) contains at most one part per billion of hydrogen or carbon monoxide impurities.

* * * * *